March 10, 1942.  D. SCARAMUCCI  2,275,474
MEASURING APPARATUS FOR DETERMINING THE DEPTH OF OIL WELLS OR THE LIKE
Filed July 13, 1939
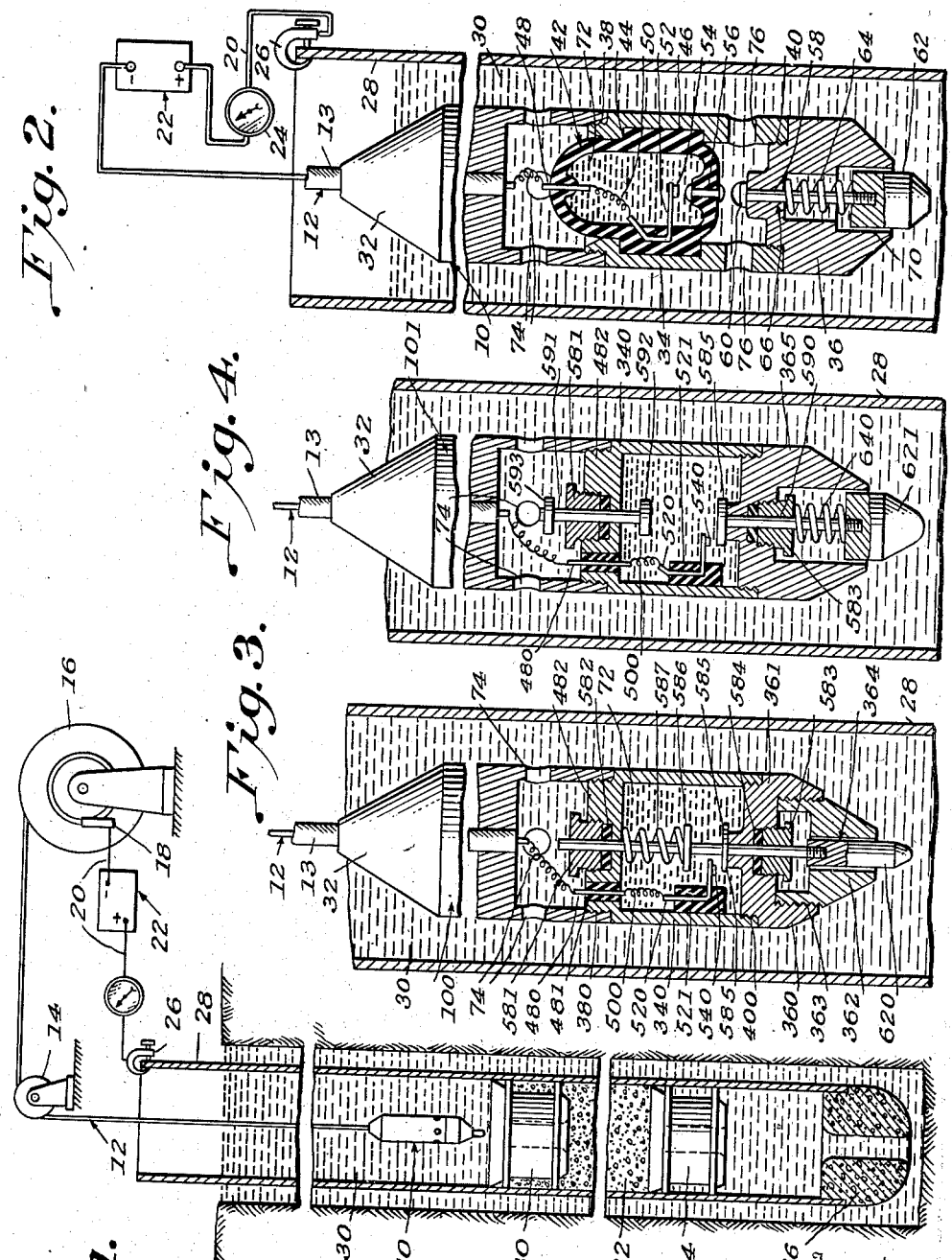
Inventor
Domer Scaramucci
By Leech + Radue
Attorneys Patented Mar. 10, 1942

2,275,474

UNITED STATES PATENT OFFICE 2,275,474

MEASURING APPARATUS FOR DETERMINING THE DEPTH OF OIL WELLS OR THE LIKE

Domer Scaramucci, Norman, Okla., assignor to Oil Equipment Engineering Corporation, Oklahoma City, Okla., a corporation of Oklahoma Application July 13, 1939, Serial No. 284,331

8 Claims. (Cl. 33—126.5)

This invention relates to a measuring apparatus for determining the depth of oil wells or the like, and more particularly to a means for determining accurately the position of an object in a well.

In the present method of sounding by the use of a simple measuring line, the operator must feel the line to determine the instant the sounding weight strikes bottom or an object in a well. The practice of this method of operating the line has been found tedious and inaccurate, especially in deep wells filled with viscous fluid which tends to deaden any sensation to be detected by feeling the line.

When a measuring line is used in the cementing of wells, cement is forced into the well casing between two plug members, the upper plug being immediately followed with the sounding weight attached to the measuring line. The operator by alternately raising and lowering the weight on the upper plug is ordinarily able to detect the plug by the feel or difference in weight, but with the increase in the depth of wells, and with an increase in the viscosity of the drilling fluid, the present practice of locating the plug becomes increasingly haphazard.

Therefore it is an object of the invention to provide means for accurately sounding wells in which excessive line friction is encountered such as exists in crooked wells, wells drilled to a great depth, and wells containing viscous fluid.

It is another object of the present invention to provide a means of transmitting signals to the surface to denote depth at which a sounding weight has encountered an object in the well.

A further object of the invention is to provide an accurate means of sounding for a cementing plug in the well casing by electrically transmitting a signal to the surface which will positively indicate the position of the plug.

A specific object resides in the provision of a sounding weight housing a pressure-balanced electric switch connected to a conducting measuring line and, through the medium of a surrounding electrolytic fluid such as is found in oil wells, to the continuous, metal casing of a well or the like.

In a co-pending application, Serial No. 283,878, filed July 11, 1939, in the name of the present inventor, there is illustrated and described a related device in which a sounding weight containing a pressure-balanced electric switch has a pair of conductors comprising the measuring line operatively connected to said switch. No claim is made herein to an apparatus having both conductors in the measuring line or to a pressure-balanced switch embodying the diaphragm construction of that application.

The preceding and other features and advantages of the invention will be better understood and appreciated from a reading of the following detailed description of a specific embodiment and two modifications thereof in connection with the accompanying drawing, in which Fig. 1 is a view, partly in longitudinal section and partly in schematic elevation, of the apparatus set up for operation in an oil well;

Fig. 2 is an enlarged longitudinal section of a preferred form of the sounding weight in a well casing and including schematic details of the electric circuit;

Fig. 3 is a similar longitudinal section of a modified form of sounding weight within a well casing; and Fig. 4 shows in longitudinal section a further modification of the weight, also within a well casing.

Referring to Fig. 1, 10 indicates generally an electrical sounding weight which is suspended by a weight line 12 which serves as an electrical conductor and is provided with a sheathing 13 of insulating material. A pulley 14 supports the weight 10 and directs the line 12 more or less horizontally to a reel 16, which is used to pay out said line and to measure the extended length thereof. This pulley 14 is mounted at the head of the well in the manner illustrated; with a conventional rotation counter (not shown), it may be used as the lineal measuring means for the line 12.

The reel 16 is provided with a connector 18 in electrical contact with the conducting line 12 and joined by a conductor 20 to a voltage source 22, indicated as a storage battery, and electric current-indicating means such as a galvanometer 24. From the galvanometer 24, the conductor 20 extends to a metal clamp 26 which is used to connect said line to a continuous, metallic, well casing 28 containing an electrolytic fluid 30. The metallic casing 28 is but one example of a conductor adapted to be placed in electrical contact with the current-conducting fluid 30, normally found in oil wells.

As shown in Figs. 2, 3, and 4, the electrical sounding weight 10, which may be of brass or other similar material, comprises a frusto-conical top portion 32, a generally cylindrical midportion 34, and a frusto-conical lower end portion 36. The midportion 34 is threaded into the top portion 32 at 38 and has the lower end portion 36 threaded into it, as indicated by the numeral 40. The chamber thus provided in the weight 10 of Fig. 1 contains a resilient cell 42, having a circumferential flange 44, secured in place in a complemental annular groove 46 of the middle weight portion 34. A contact pin 48 extends through the upper end of the cell 42, and may be molded therein. At its upper end, the contact pin or member 48 is connected to the conducting weight line 12, and at its lower end, which is within the cell, it is joined by a conductor 50 to a terminal 52 of a two-terminal electric switch. The terminal 52 is partially embedded in the wall of cell 42, has a portion 52 extending horizontally within the cell 42, and carries a contact or point 54 on its underside in alignment with a contact pin 56 extending through the bottom wall portion of said cell. Pin 56 is preferably of brass, and of the double-headed rivet shape, illustrated in Fig. 2; it also may be molded into the rubber cell 42.

In an aligned position below the pin 56, is a pin 58 reciprocable in the lower end portion 36 of weight 10. The pin means 58 is metallic, e. g., brass, and includes an integral upper head 60 and a metallic head or member 62 threadedly connected to its lower end, and projecting outwardly of the weight 10. A coil compression spring 64 is arranged to hold the head 62 in the outwardly extended position of Fig. 2. It should be noted also, that the pin means 58 has a sliding fit in bore 66 of lower end portion 36, that the spring or resilient means 64 abuts the upper end of a counterbore 68 and the adjacent end of the head 62, and that said head is fitted into a still larger counterbore 70, which opens at the lower end of weight 10.

The molded rubber switch cell 42 is filled with an insulating fluid 72, such as oil, and is exposed at its upper end to the pressure of fluid in casing 28 by reason of a circumferentially spaced series of openings 74 extending into the chambered portion of the weight 10. Below the cell 42, a similar series of openings 76 exposes the lower portion of said cell to the pressure of the casing fluid 30.

When the weight 10 of Fig. 2 encounters an object, such as a solid or substantial upper cementing plug 80 (which is shown within the casing 28 of Fig. 1), the head 62 will be pushed into the weight so as to move the pin means 58 upwardly against the spring 64. As the head 60 of pin means 58 engages the lower end of contact pin 56, the upper end or contact of said pin will be moved into engagement with the contact 54 on the switch terminal 52. The circuit which this operation of the pin means 58 closes comprises conductor 20, current-indicating means 24, battery or other current source 22, the line conductor 12, contact pin 48, conductor 50, switch terminal 52, point 54, contact pin 56, the electrolytic bore hole fluid 30, and the metallic casing 28. In this form of weight and switch, the conducting fluid 30 will be in direct electrical contact with the brass contact pin 56, and the metallic pin means 58 through its ends, and through its sliding engagement with the lower end portion 36 of metallic weight 10.

As previously noted, the rubber switch cell 42 is subjected to hydraulic pressure on opposite ends and is filled with an incompressible fluid. Note is taken also that the cell 42 is laterally restrained throughout most of its vertical dimension by the mid-portion 34 of the sounding weight. The sealed switch chamber which is thus provided completely excludes the electrolytic well fluid and balances any tendency which the hydrostatic pressure of such fluid below the cell would have to close the spaced switch contacts 54 and 56 by a substantially equal, hydrostatic force applied at the upper end. This effect is comparable with that produced by opposed pistons which are always separated a predetermined distance and have equal forces acting thereon. Coil spring 64 will act to prevent accidental operation of the pin means 58 in response to hydrostatic pressure, but will yield to operate the switch means when overcome by the mass of the weight 10 acting downwardly against a substantial and relatively stationary object in the well bore.

By means of the sounding weight which has been described, it is possible accurately to determine at all times the location in well casing 28 of a fluid cement body 82, which is pumped down said casing between the upper plug 80 and a lower plug 84. Those versed in this art will realize the importance for cementing purposes of precise knowledge as to the nearness of the cement to the bottom or shoe 86 of the well. The electrical sounding device of the present invention provides unusually efficient and relatively simple means for checking the position of the cement throughout its descent in the well.

A modified form of means for balancing the effect of a hydrostatic head on the switch-operating member is illustrated in Fig. 3. In this modification, a weight 100 includes the upper top portion 32, an intermediate portion 340 of inverted and cylindrical cup-shape, and a lower end portion 360. The member 340 is threaded into the upper portion 32 at 380, and has the lower portion 360 threaded into its lower end at 400. A contact pin 450 of brass or the like has an insulating bushing 481 which extends through an end portion 482 of the member 340. This end portion 482 divides the chambered portion of weight 100, in the manner shown. The insulated line conductor 12 is led through the upper end portion 32 into the chamber of weight 100, where it is connected to the adjacent end of the contact pin 480. The other end of pin 480, which is on the opposite side of the partition member 482, has a conductor 500 connecting it to a switch terminal 520 partially embedded in an insulating block 521, suitably secured to the inside of the intermediate weight portion 340. A contact or point 540 is attached to the underside of a laterally extending portion of terminal 520. Within the same chamber as the contact 540, there is a reciprocable pin means 580, which has its upper end extending through the partition member 482. A threaded packing gland 581, and a compressible packing 582 seal the upper end of pin means 580, so that fluid cannot leak in from the upper portion of the weight chamber, which portion contains the openings 74 for admission of bore hole fluid 30. The lower end of pin means 580 extends through the lower end portion 360 of the weight and is sealed with a threaded gland 583 and compressible packing 584, similar to that described previously. Although it is not possible for fluid to leak into the portion of the weight chamber which encloses the switch terminal 520, and a spaced contact member 585 carried by the reciprocable means 580, it is preferable to fill the switch chamber with the insulating fluid 72, in order that all possibility of inflow of corrosive bore hole fluid can be eliminated. A collar 586, secured to the pin means 580 above the member 585, furnishes a lower seat for a compression spring 587 having its upper end bearing against the partition member 482, for biasing the point 540 and contact member 585 in a spaced relation.

The lower end portion 360 of the weight 100 receives a lower guide member 362 in a threaded opening 363, and thus affords means for assembling the pin means 580 and the weight 100. Threaded to the lower end of the pin means 580 is a head 620 which projects outwardly from the weight 100 and slides in a longitudinal bore 364 of guide member 362.

The operation of the Fig. 3 modification may be described sufficiently by pointing out that upward reciprocation of pin means 580 will engage the switch contacts 540 and 585 and complete the circuit which includes the metallic pin means 580, lower portion 360, and the conducting well fluid 30. Pressure balancing in this instance is obtained by the approximately equal pressures acting on the opposite ends of pin means 580.

Because of the close similarity between the modified form of weight, shown in Fig. 3 and the further modification of Fig. 4, only the essentially different characteristics of the latter will be explained in detail. A somewhat different form of means for balancing hydrostatic pressure is provided by separating the switch operating member or reciprocable pin means into two parts. One of these is a lower pin means 590 having the switch terminal and movable contact member 585 on its upper end within the oil-filled chambered portion of weight 101 and a metallic head member 621 threadedly connected to its lower end and projected outwardly of said weight by a compression spring 640. Through the partition member 482, there extends the other, a plunger 591 which has an enlarged lower head 592 within the chambered portion of weight 101 and a similar head 593 detachably secured to its upper end, where it will be subject to the pressure of well fluid 30 entering the weight 101 through its openings 74. The reciprocable pin means 590 is sealed by a packing gland 593 threaded in a lower end portion 365 of weight 101; and the plunger 591 is also provided with a packing gland, 581, threaded into the partition member 482 after the manner described with respect to Fig. 3.

It is possible with this arrangement to provide pressure balancing means separate from the switch operating means 590. Plunger 591 can move relatively to the switch-operating member 590 in response to any up or down movement of the latter. Obviously, this modification requires that the switch chamber of weight 101 be filled with insulating fluid 72.

In this instance, a predetermined amount of pressure-balancing is obtained by use of the separate plunger 591 which has one end within the fluid-filled switch chamber of weight 101 and an opposite end exposed to the hydrostatic pressure of the well fluid. Accordingly, any tendency toward upward movement by the lower pin means 590 in response to hydrostatic pressure on its head member 621 is opposed by the action of the plunger 591, the fluid filling the switch chamber being incompressible. It is only when the additional gravitational force of the weight 101 becomes effective, that is, upon obstruction to movement of the reciprocating head member 621, that sufficient unbalance can be obtained to operate the switch means represented by contacts 540 and 585.

Without modification, each of the specific sounding weights and its associated pressure-balanced switch means may also be used with the two-conductor element line of the co-pending application which has been referred to herein. That is to say, instead of relying upon the electrolytic well fluid 30, which connects to one side or terminal of the switch means through a metallic portion of the weight 10, a second line conductor can be joined directly to said metallic portion.

What I claim is:

1. An electrical sounding device for use in electrolytic liquids, which comprises a generally cylindrical weight provided with an internal chamber; a body of insulating liquid filling said chamber, an electric switch having spaceable contacts within said chamber; slidable pin means extending through the wall of the chamber and arranged to operate the switch, said pin means having a head portion projecting outwardly of the weight and a plunger portion on its opposite end also extending through the wall of the chamber, and said weight being provided with openings for exposing the plunger to the pressure of a liquid in which it is immersed; resilient means for urging the head portion of the pin outwardly of the weight for yielding engagement with an external object; and a weight line comprising an insulated conductor connected to one contact of said switch, the other contact being provided by the pin means.

2. A sounding weight for use in oil wells or the like comprising a fluid-filled chamber; an electric switch having spaceable contacts within said chamber; and slidable pin means extending through a wall of the chamber and arranged to operate the switch when slid by engagement of its head portion with an external object, said pin means having a head portion projecting outwardly of the weight and a plunger portion on its opposite end also extending through a wall of the chamber, and said weight being provided with openings for exposing the plunger to the pressure of the liquid in the well or the like.

3. In an electric sounding apparatus for use in cased wells of considerable depth, a sounding weight adapted to be lowered into the metallic casing of the well; make-and-break electric switch means carried by said weight; a sounding line secured to said weight and comprising a single, insulated conductor connected in circuit with one side of said switch means, the other side thereof having an electrical connection through the said weight presenting an exposed contact on its outside adapted to be placed in circuit with the metallic casing; and means projecting outwardly from and movably associated with the said weight and constructed and arranged to operate the switch means when said projecting means encounters a solid object in the well.

4. In a system for electrically sounding oil wells having a metallic casing extending substantially throughout the depth thereof, the combination comprising a sounding weight adapted to be lowered into the metallic casing of the well; a make-and-break electric switch within said weight; a weight line consisting of a single insulated conductor connected at one end to one terminal of said switch, the other terminal of said switch having an electrical connection through said weight presenting an exposed contact on the outside of said weight adapted to be placed in circuit with the adjacent portion of the metallic casing; a switch-operating member projecting from said weight and movable with respect thereto constructed and arranged to operate the switch upon encounter with a solid object within the well casing; and current flow indicating means connected in circuit with the other end portion of the weight line conductor and the surface end of the metallic casing.

5. A sounding weight for use in oil wells or the like comprising electric switching means; conductors operatively associated with said switching means for controlling a source of current; a liquid-filled chamber in said weight containing said switching means; and means partially projecting from and slidably associated with the weight and arranged for opening and closing said switching means when slid by being brought into contact with an external object, said switch operating means having opposed portions arranged to be exposed to approximately the same hydrostatic pressure in the well or the like so as to counteract the tendency of the switch operating means to move in response to hydrostatic pressure on the part thereof which projects from the weight for engagement with an external object.

6. An electrical sounding device for use in electrolytic liquids, which comprises a generally cylindrical weight with frusto-conical ends and provided with an internal chamber; a body of insulating liquid filling said chamber; a plunger confined entirely within the weight extending through the wall of the chamber, said weight being provided with openings for exposing the portion of the plunger without said chamber to the pressure of a liquid in which it is immersed; an electric switch having a pair of spaced contacts within said chamber; slidable pin means also extending through the wall of the chamber and having one of the contacts secured thereto, said pin means having a head portion projecting outwardly of the weight; resilient means for extending the pin outwardly of an end of the weight; and a weight line comprising an insulated conductor connected to the other contact, the pin means being adapted to connect the electrolytic fluid to the first mentioned contact.

7. A sounding weight for use in oil wells or the like comprising a chamber filled with insulating liquid; an electric switch having a pair of spaceable contacts within said chamber; a plunger confined entirely within the weight and extending through the wall of the chamber, said weight being provided with openings for exposing the portion of the plunger without said chamber to the pressure of the liquid in the well or the like; and slidable pin means also extending through a wall of the chamber and having one of the contacts secured thereto, said pin means having a head portion projecting outwardly of the weight for operating the switch when brought into contact with a solid object.

8. A sounding weight for use in oil wells or the like comprising electric switching means having spaceable contacts; conductors operatively associated with said switching means for controlling a source of current; a liquid-filled resilient cell forming a pressure-balanced chamber enclosing the contacts of said switching means; and means movably associated with the weight and cell and projecting outwardly from said weight from a position adjacent said cell for operating said switching means by pressure on said cell when brought into contact with a solid object.

DOMER SCARAMUCCI.